(12) United States Patent
Ben-Hagai et al.

(10) Patent No.: US 12,124,372 B1
(45) Date of Patent: Oct. 22, 2024

(54) CACHING A SHARED CLOCK OF A DISTRIBUTED STORAGE SYSTEM

(71) Applicant: VAST DATA LTD., Tel Aviv (IL)

(72) Inventors: Ilan Ben-Hagai, Tel Aviv (IL); Avi Goren, Tel Aviv (IL); Ben Danon, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 36 days.

(21) Appl. No.: 18/058,855

(22) Filed: Nov. 25, 2022

(51) Int. Cl.
*G06F 12/0891* (2016.01)
*G06F 12/084* (2016.01)

(52) U.S. Cl.
CPC ........ *G06F 12/084* (2013.01); *G06F 12/0891* (2013.01)

(58) Field of Classification Search
CPC ............................ G06F 12/084; G06F 12/0891
See application file for complete search history.

(56) References Cited

U.S. PATENT DOCUMENTS

2013/0339742 A1* 12/2013 Ignatchenko ......... H04L 9/3268
713/176

* cited by examiner

*Primary Examiner* — Michael Krofcheck
*Assistant Examiner* — Janice M. Girouard
(74) *Attorney, Agent, or Firm* — Reches Patents

(57) ABSTRACT

A method for reading a shared clock that is stored in a shared storage space of a storage system, the method may include (a) reading by a compute node a cached value of the shared clock when a time gap before a next update of the shared clock exceeds a time threshold, wherein the cached value is cached in the compute node and is valid during an allowable caching period, wherein the shared clock is shared by a group of compute nodes, wherein a default update of the shared clock has a cycle that exceeds the time threshold; and (b) reading by the compute node a read value of the shared clock when the time gap before the next update of the shared clock does not exceed the time threshold, wherein the read value of the shared clock is stored in the shared storage space.

21 Claims, 4 Drawing Sheets

CACHING A SHARED CLOCK OF A DISTRIBUTED STORAGE SYSTEM

TECHNICAL FIELD

The present disclosure generally relates to the field of data storage, and more particularly to reading and caching a shared clock that is stored in a shared storage space of a storage system.

BACKGROUND

A system clock is required in a storage system for ordering events according to their occurrence, and to stamp stored entities accordingly.

In a distributed storage system, where multiple compute nodes handle data entities that requires stamping of the time of creation or modification, there is a need to use a shared clock and to distribute or publish the shared time among the compute nodes.

When the shared clock is handled in a machine that is separate and external to the compute nodes, where accessing the shared clock or distributing the global time is done across a network, frequent accesses for obtaining the value of the shared clock degrade the system performance.

SUMMARY

There may be provided a storage system, a method and a non-transitory computer readable medium for reading and caching a shared clock that is stored in a shared storage space of a storage system.

There may be provided a method for reading a shared clock that is stored in a shared storage space of a storage system, the method may include reading by a compute node a cached value of the shared clock when a time gap before a next update of the shared clock exceeds a time threshold, wherein the cached value is cached in the compute node and is valid during an allowable caching period, wherein the shared clock is shared by a group of compute nodes, wherein a default update of the shared clock has a cycle that exceeds the time threshold; and reading by the compute node a read value of the shared clock when the time gap before the next update of the shared clock does not exceed the time threshold, wherein the read value of the shared clock is stored in the shared storage space.

There may be provided a non-transitory computer readable medium for reading a shared clock that is stored in a shared storage space of a storage system, the non-transitory computer readable medium stores instructions that once executed by a compute node of the storage system cause the compute node to: read a cached value of the shared clock when a time gap before a next update of the shared clock exceeds a time threshold, wherein the cached value is cached in the compute node and is valid during an allowable caching period, wherein the shared clock is shared by a group of compute nodes, wherein a default update of the shared clock has a cycle that exceeds the time threshold; and read a read value of the shared clock when the time gap before the next update of the shared clock does not exceed the time threshold, wherein the read value of the shared clock is stored in the shared storage space.

There may be provided a storage system that may include a group of compute nodes; and a storage resource that maintains a shared storage space. The storage resource may be a storage node or any other storage entity. A compute node of the group of compute nodes is configured to: read a cached value of a shared clock when a time gap before a next update of the shared clock exceeds a time threshold, wherein the cached value is cached in the compute node and is valid during an allowable caching period, wherein the shared clock is shared by the group of compute nodes, wherein a default update of the shared clock has a cycle that exceeds the time threshold; and read a read value of the shared clock when the time gap before the next update of the shared clock does not exceed the time threshold, wherein the read value of the shared clock is stored in the shared storage space.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
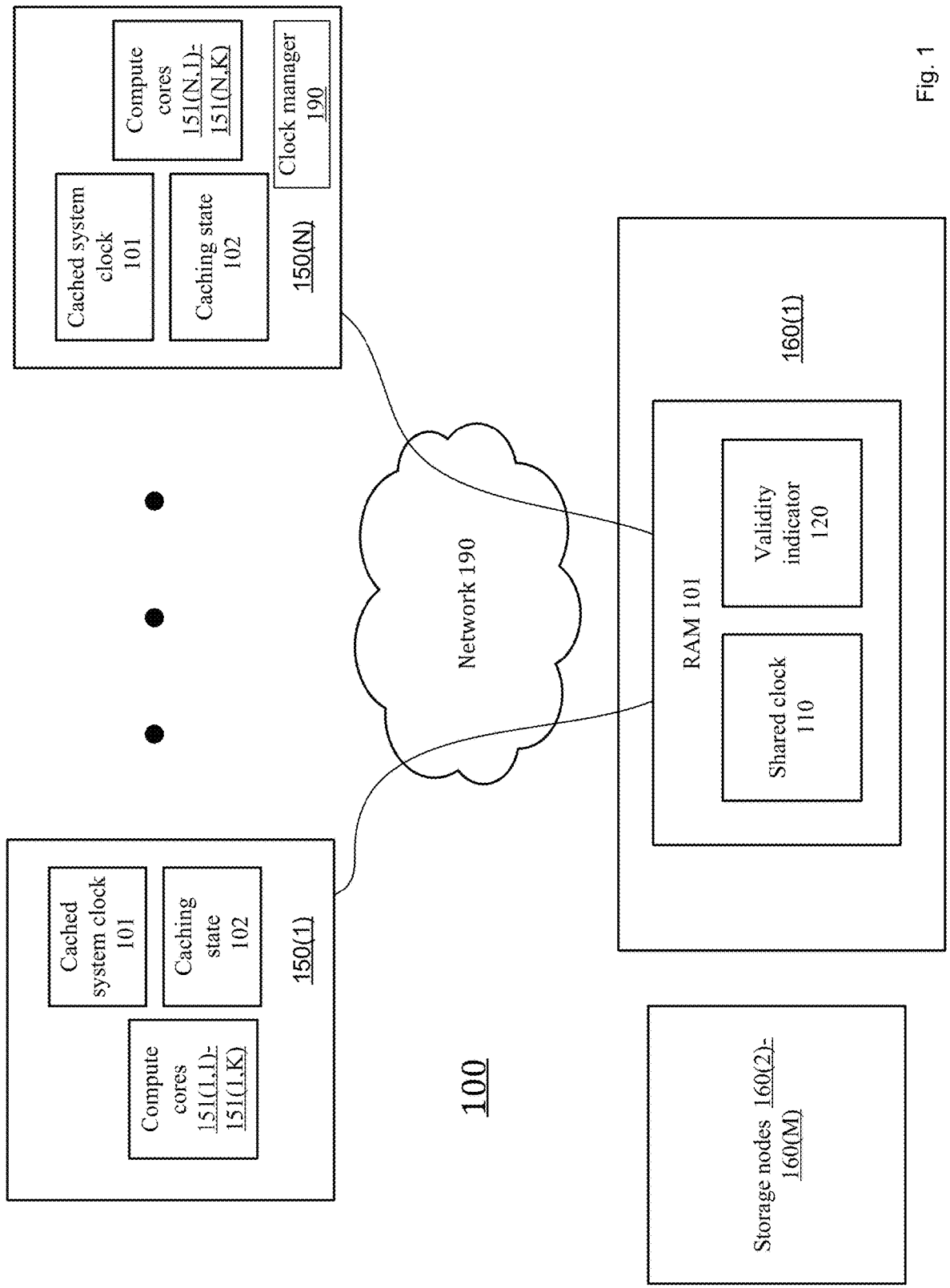
FIG. 1 is an example of a storage system and its environment.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided storage systems, methods, and non-transitory computer readable me-dia for reading and caching a shared clock that is stored in a shared storage space of a storage system.

The shared clock may be shared by a group of compute nodes. The shared clock may be a shared system clock that is shared by all compute nodes of the storage system—but it may be shared by a group of only some of the compute nodes of the storage system.

A shared clock is stored in a shared storage location accessible to multiple compute nodes of a storage system via a network. The shared clock provides the system time that is needed for stamping data or metadata associated with events, such as stamping: data writes, snapshots, database transactions, etc. The system time should be unique across all the compute nodes, and all the compute nodes should be aware of the clock advancement.

The shared clock may be advanced using a fixed frequency, e.g., every minute, every second, etc., but may be also advanced in response to requests of entities within the storage system or outside the storage system, where the clock advances not at the expected pace. For example, when a snapshot needs to be taken, or when a replication cycle starts, there may be a request to advance the shared clock. Therefore, the timing of advancing the system clock may not be transparent to the compute nodes.

The shared clock may be advanced by one of the compute nodes that functions as the clock manager on behalf of the compute nodes.

Since all the compute nodes write data that may be related to the same snapshots (or handle transactions related to the same database elements), all the compute nodes need to be synchronized to the same value of the shared clock.

The shared clock may be a counter stored in the shared storage space, e.g., a RAM (Ran-dom Access Memory) of a storage node that is accessible to all the compute nodes, and may be readable via a communication protocol, such as a RDMA (Remote direct memory access)-based NVMe (Non-Volatile Memory Express) over fabric. Yet, reading the shared clock upon every time data is written to the storage system and needs to be stamped, may influence the performance substantially and add latencies to write operations.

According to embodiments of the present invention, the compute nodes may be allowed to cache the value of the shared clock, for a limited allowed caching period that is indicated for the system clock and stored in the shared storage location along with the system clock.

When the clock manager is not expecting a need to advance the system clock within a certain time window, it will set a value of the allowed caching period to a certain value of time, e.g., 10 milliseconds. Note that the certain value of the allowed caching period is much smaller than the frequency of changing the clock, by at least 10, 100, 6000, etc. This is needed for cases where a non-scheduled request to advance the clock is obtained and cannot be delayed for a longer time than the allowed caching period.

When the clock manager is aware of an upcoming need to advance the clock (for example there is less than a time threshold before the next clock update), it will set the allowed caching period to zero, to indicate a state where the caching is forbidden to the compute nodes. The clock manager may become aware of an upcoming need to advance the clock upon either of these cases: (i) the system clock needs to be advanced, according to the scheduled frequency, within a time period that is substantially equal (i.e., equal or slightly longer) to the allowed caching period (e.g., 10-12 milliseconds); (ii) when the clock manager receives an explicit request to advance the system clock. On both cases, the clock manager will set the allowed caching period to zero, to indicate a state where the caching is forbidden. Substantially may allow deviation of, for example, 5, 10, 15, 25 percent of the value and/or may allow deviations of, for example, up to 1, 2, 3, 5 milliseconds and the like.

When the clock manager receives an explicit request to advance the system clock, instead of advancing the clock immediately, the clock manager, delays the update of the system clock for a time period that equals at least the allowed caching period, so as to allow all the compute nodes to finish the caching period, stop caching and get updated with the caching forbidden state.

Once the system clock is advanced, the allowed caching period is restored to the certain value of time, e.g., 10 milliseconds.

Each of the compute nodes read the system clock and the allowed caching period from the shared storage location. If the allowed caching period is zero, i.e., caching is not allowed, then the system clock will not be cached in the internal memory of the compute node, and any subsequent request received by the compute node, that requires time stamping (e.g., write request, snapshot request, transaction) will read the system clock and the allowed caching period from the shared storage location, until the compute node reads a positive value of the allowed caching period that indicates that caching is allowed again. When the allowed caching period has a positive value, the compute node will cache the value of the system clock in its internal memory, and subsequent write requests (or other requests that requires time stamping) will use the cached value of the system clock.

The compute node re-reads the system clock from the shared storage location only when the allowed caching period expires, and repeats the reading the clock at a frequency that matches the value of the allowed caching period.

FIG. 1 illustrates a storage system 100 that includes computes nodes 150(1)-150(N) that access a storage node 160(1) via a fabric, such as network 190. Storage node 160(1) includes, inter alia, a RAM memory 101 that stores a shared clock 110 that may be a counter that is advanced with time or upon explicit request, and a validity indicator 120 that may be a variable that stores the value of allowed caching period 120. The storage system may include M storage nodes 160(1)-160(M), where the shared clock 110 and validity indicator 120 are stored in one of the M storage nodes, although one or more other storage nodes may store copies of shared clock 110, for redundancy purposes, e.g., when storage node 160(1) becomes unavailable for the compute nodes, another storage node may become the provider of shared clock 110.

The compute nodes include (or may execute) multiple compute cores each (for example 151(1,1)-151(1,K) of compute node 150(1) and 151(N,1)-151(N,K) of compute node 150(N). The compute nodes communicate with user computers for receiving read and write requests, snapshot requests, and other requests that may be involved in stamping stored data entities, according to the value (shared or cached) of the system clock.

The storage system 100 may include a clock manager 190. The clock manager may be one of the compute nodes, may be executed by one of the compute nodes, or may differ from a compute node.

Both shared clock 110 and allowed caching period 120 are read by compute nodes 150, at least on time intervals that equal the allowed caching period-when caching is allowed, or upon every time a stamping is needed-when caching is forbidden. Compute nodes 150 store the cached system clock 101 in its internal memory, and the caching state, enabled or disabled, in ac-cordance with the value of allowed caching period 120.

In an embodiment, any compute node may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 150 does not require any dedicated hardware.

Figure 2:
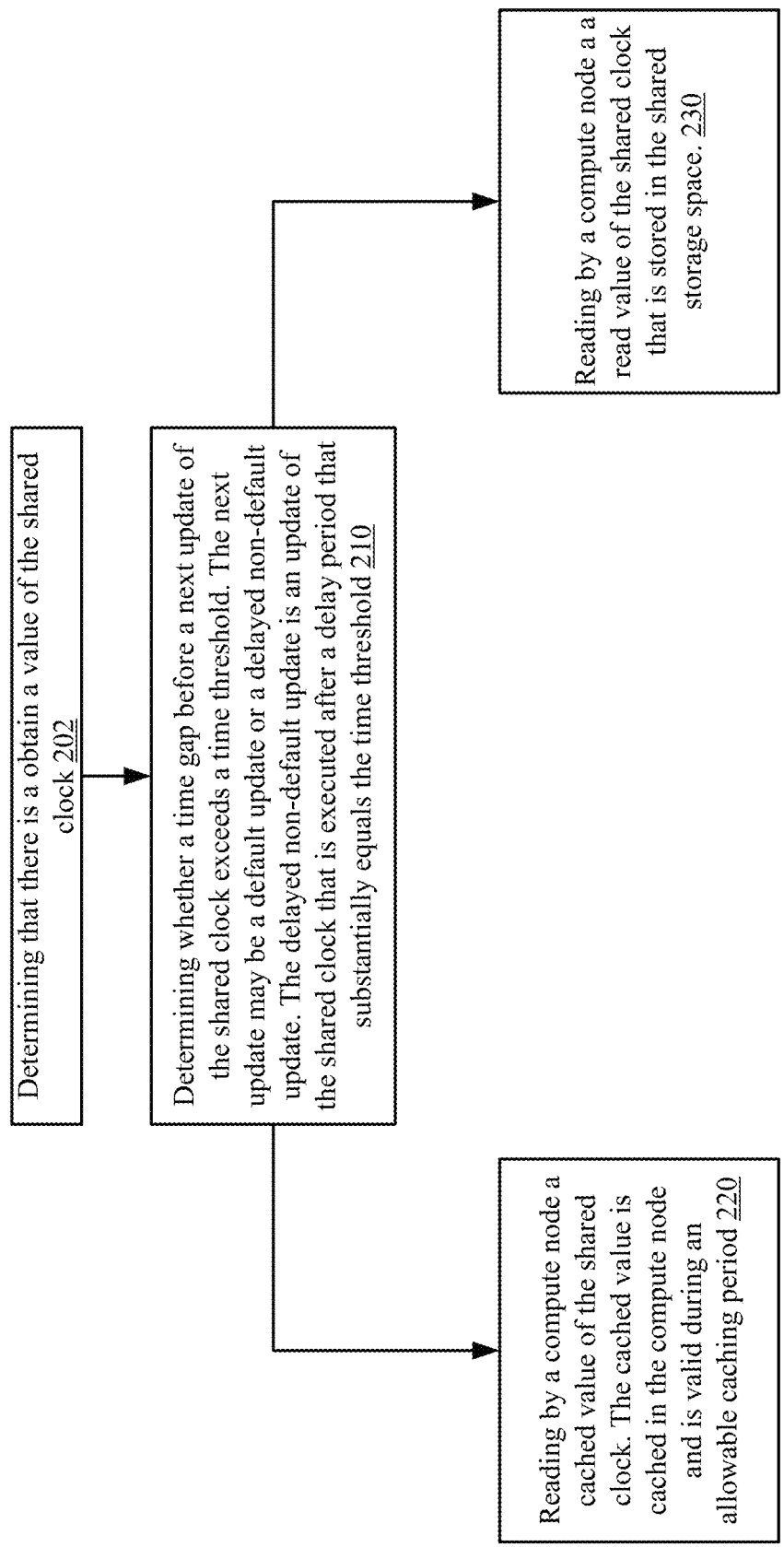
FIG. 2 is an example of a method.

FIG. 2 illustrates an example for method 200 for reading a shared clock that is stored in a shared storage space of a storage system and for caching the value of the shared clock.

Method 200 may be executed by any compute node of a group of compute nodes that share the shared clock.

Method 200 may start by step 202 of determining that there is a need to obtain a value of the shared clock.

Step 202 may be executed, for example, when a validity of a cache value of the shared clock is about to expire.

Step 202 may be followed by step 210 of determining whether a time gap before a next update of the shared clock exceeds a time threshold. The next update may be a default update or a delayed non-default update. The delayed non-default update is an update of the shared clock that is executed after a delay period that substantially equals the time threshold. The delayed non-default update is an update of the shared clock that may be explicitly requested and may not be part of a scheduled update of the clock, or may not match the regular frequency of the clock tick. The delay is counted from the time when a request to update the clock is obtained. The delay is aimed to align the cached value of the different compute nodes of the group—that may access the shared storage space once in a while—for example once per a period of a length that substantially equals the time threshold. In previous examples the value of the delay was about 10 ms. It should be noted that the value of the delay as well as the allowed caching period may change over time—for example based on communication load, and/or computational load, and the like.

Step 210 may be based on a value of a validity indicator that is read by the compute node. The validity indicator is indicative of a caching validity of a read value, which is a value of the shared clock that is read by a compute node. The caching validity indicates whether the read value can be cached and used by the compute node. If the caching validity indicates that the read value is caching invalid—the compute node should read the shared clock from the shared storage space at the next time that the value of the shared clock is required—for example when a new data unit is received by the storage system, when there is a need to generate a next timestamp, and the like. If the caching validity indicates that the read value is caching valid then the compute node may use the cached value (while valid) instead of reading the shared clock from the shared storage space at the next time that the value of the shared clock is required.

When the time gap before the next update of the shared clock exceeds the time threshold then step 210 is followed by step 220 of reading by a compute node a cached value of the shared clock. The cached value is cached in the compute node and is valid during an allowable caching period that may be indicated by the caching validity.

The duration of the allowable caching period may substantially equal the time threshold.

When the time gap before the next update of the shared clock does not exceed the time threshold then step 210 is followed by step 230 of reading by the compute node a read value of the shared clock that is stored in the shared storage space.

Steps 220 and 230 may be followed by step 240 of utilizing at least one of the cached value and the read value. For example—generating a time stamp and storing stamped data entities.

Figure 3:
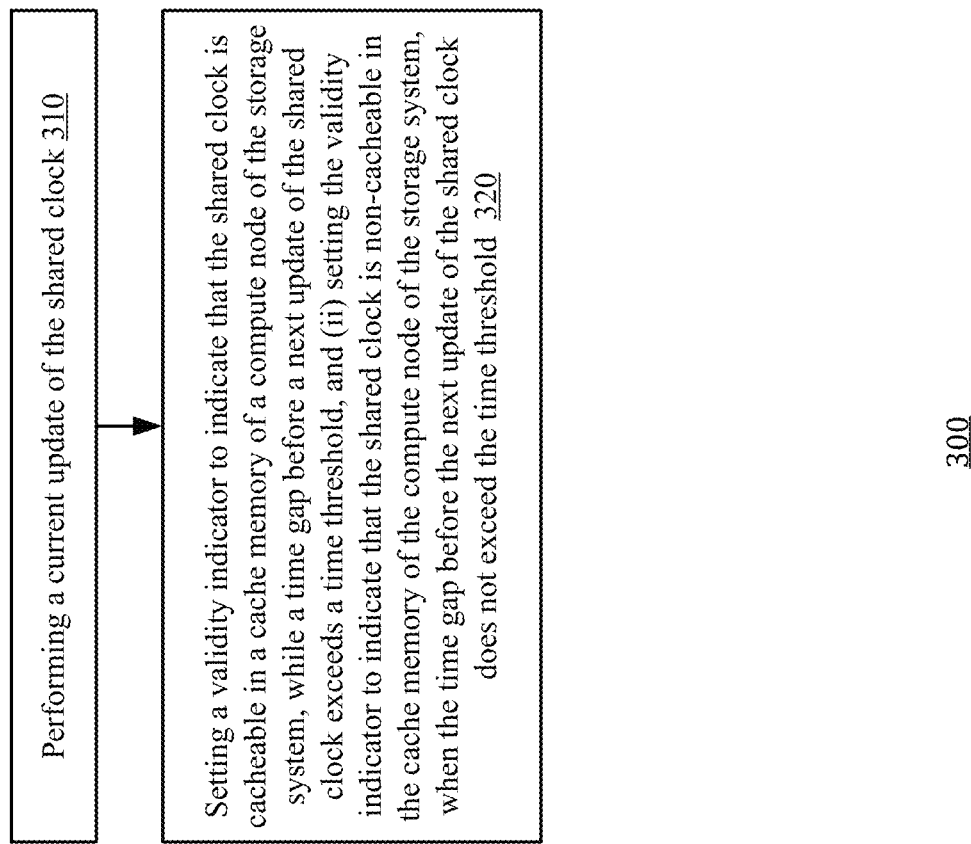
FIG. 3 is an example of a method.

FIG. 3 illustrates an example of method 300 for managing a shared clock that is stored in a shared storage space of a storage system.

Method 300 may include multiple repetitions of steps 310 and 320 and may be performed by the clock manager.

Step 310 may include performing a current update of the shared clock.

Step 320 may include (i) setting a validity indicator to indicate that the shared clock is cacheable in a cache memory of a compute node of the storage system, while a time gap before a next update of the shared clock exceeds a time threshold, and (ii) setting the validity indicator to indicate that the shared clock is non-cacheable in the cache memory of the compute node of the storage system, when the time gap before the next update of the shared clock does not exceed the time threshold.

Each one of the current update and the next update of the shared cache is a delayed non-default update or a default update.

Figure 4:
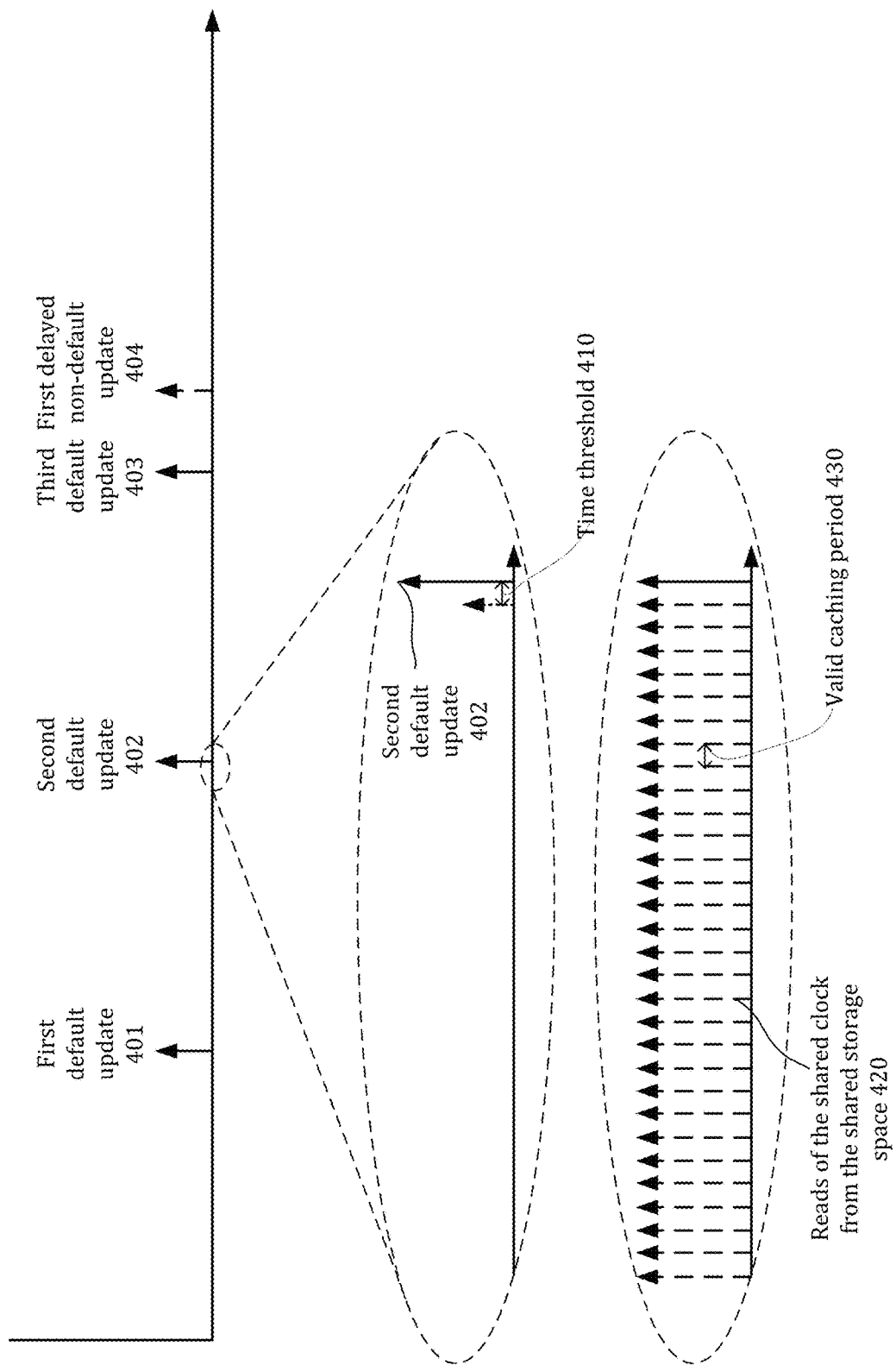
FIG. 4 is an example of a timing diagram.

FIG. 4 is an example of timing diagrams.

The upper timing diagram illustrates first till third default updates 401-402 and 403 of the shared clock. The first till third default updates may be periodic updates and the period may be, for example, 1 second, 1 minute, 1 hour, and the like. The upper timing diagram also illustrates a first delayed non-default update 404.

The two lower timing diagrams illustrates events occurring in proximity to the second default update 402.

A time gap that equals time threshold 410 occurs before the second default update 402. During this time gap step 210 may be followed by step 230.

After the first default update 401 and until reaching the time gap-step 210 may be followed by step 220.

The lowest timing diagram illustrates multiple reads 420 of the shared clock from the shared storage space-preceding the time gap. The different between adjacent reads may equal the allowable caching period 430.

It should be noted that a combination of methods 200 and 300 can be provided—and may even, for example be executed within the same storage system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices inter-connected with each other in a suitable manner.

However, other modifications, variations and alternatives are also possible. The specifica-tions and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms de-scribe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for reading a shared clock that is stored in a shared storage space of a storage system, the method comprises:
   reading by a compute node a cached value of the shared clock when a time gap, from a current time until a next update of the shared clock, exceeds a time threshold, wherein the cached value is cached in the compute node and is valid during an allowable caching period, wherein the shared clock is shared by a group of compute nodes, wherein a default update of the shared clock has a cycle that exceeds the time threshold; and
   reading by the compute node a read value of the shared clock when the time gap, from the current time until the next update of the shared clock, does not exceed the time threshold, wherein the read value of the shared clock is stored in the shared storage space.

2. The method according to claim 1, wherein the next update of the shared clock is selected out of a delayed non-default update and the default update.

3. The method according to claim 2, wherein the delayed non-default update is an update of the shared clock that is executed after a delay period that substantially equals the time threshold.

4. The method according to claim 1, comprising reading, by the compute node, a validity indicator that is indicative of a caching validity of the read value.

5. The method according to claim 4, comprising preventing from caching the read value when the validity indicator indicates that the read value is caching invalid.

6. The method according to claim 4, comprising caching the read value to provide a new cache value, wherein the new cached value is deemed valid for a duration indicated by the validity indicator.

7. The method according to claim 4, wherein the validity indicator is stored in the shared memory space.

8. The method according to claim 4, comprising reading, by the compute node, a next read value of the shared clock before an expiration of caching validity of the read value.

9. The method according to claim 1, comprising generating, by the compute node, timestamps based on at least one of the cached value and the read value.

10. The method according to claim 1, wherein a duration of the allowable caching period substantially equals the time threshold.

11. A non-transitory computer readable medium for reading a shared clock that is stored in a shared storage space of a storage system, the non-transitory computer readable medium stores instructions that once executed by a compute node of the storage system cause the compute node to:
    read a cached value of the shared clock when a time gap, from a current time until a next update of the shared clock, exceeds a time threshold, wherein the cached value is cached in the compute node and is valid during an allowable caching period, wherein the shared clock is shared by a group of compute nodes, wherein a default update of the shared clock has a cycle that exceeds the time threshold; and
    read a read value of the shared clock when the time gap, from a current time until the next update of the shared clock, does not exceed the time threshold, wherein the read value of the shared clock is stored in the shared storage space.

12. The non-transitory computer readable medium according to claim 11, wherein the next update of the shared clock is selected out of a delayed non-default update and the default update.

13. The non-transitory computer readable medium according to claim 12, wherein the delayed non-default update is an update of the shared clock that is executed after a delay period that substantially equals the time threshold.

14. The non-transitory computer readable medium according to claim 11, that stores instructions that once executed by the compute node of the storage system cause the compute node to reading, by the compute node, a validity indicator that is indicative of a caching validity of the read value.

15. The non-transitory computer readable medium according to claim 14, that stores instructions that once executed by the compute node of the storage system cause the compute node to preventing from caching the read value when the validity indicator indicates that the read value is caching invalid.

16. The non-transitory computer readable medium according to claim 14, that stores instructions that once executed by the compute node of the storage system cause the compute node to caching the read value to provide a new cache value, wherein the new cached value is deemed valid for a duration indicated by the validity indicator.

17. The non-transitory computer readable medium according to claim 14, wherein the validity indicator is stored in the shared memory space.

18. The non-transitory computer readable medium according to claim 14, that stores instructions that once executed by the compute node of the storage system cause the compute node to reading, by the compute node, a next read value of the shared clock before an expiration of caching validity of the read value.

19. The non-transitory computer readable medium according to claim 11, that stores instructions that once executed by the compute node of the storage system cause the compute node to generating, by the compute node, timestamps based on at least one of the cached value and the read value.

20. The non-transitory computer readable medium according to claim 11, wherein a duration of the allowable caching period substantially equals the time threshold.

21. A storage system comprising:
    a group of compute nodes; and
    a storage resource that maintains a shared storage space;
    wherein a compute node of the group of compute nodes is configured to:
        read a cached value of a shared clock when a time gap, from a current time until a next update of the shared clock, exceeds a time threshold, wherein the cached value is cached in the compute node and is valid during an allowable caching period, wherein the shared clock is shared by the group of compute nodes, wherein a default update of the shared clock has a cycle that exceeds the time threshold; and
        read a read value of the shared clock when the time gap, from a current time until the next update of the shared clock, does not exceed the time threshold, wherein the read value of the shared clock is stored in the shared storage space.

* * * * *